(12) United States Patent
Raszkowski

(10) Patent No.: US 7,327,059 B2
(45) Date of Patent: Feb. 5, 2008

(54) INTEGRATED MOTOR BEARING SPRINGS FOR HYBRID ELECTRO-MECHANICAL TRANSMISSION AND METHOD

(75) Inventor: James A. Raszkowski, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 348 days.

(21) Appl. No.: 11/058,100

(22) Filed: Feb. 15, 2005

(65) Prior Publication Data

US 2005/0206259 A1 Sep. 22, 2005

Related U.S. Application Data

(60) Provisional application No. 60/555,141, filed on Mar. 22, 2004.

(51) Int. Cl.
*H02K 5/16* (2006.01)

(52) U.S. Cl. .................................... 310/90

(58) Field of Classification Search ............... 310/90, 310/90.5, 67 R
See application file for complete search history.

(56) References Cited

U.S. PATENT DOCUMENTS

| 5,044,789 | A | * | 9/1991 | Damon et al. ............... 384/581 |
| 5,396,968 | A | | 3/1995 | Hasebe et al. ............. 180/65.6 |
| 5,483,113 | A | * | 1/1996 | Sakuragi et al. .......... 310/67 R |
| 6,022,287 | A | * | 2/2000 | Klemen et al. ............... 475/5 |
| 2002/0168126 | A1 | | 11/2002 | Shimizu ..................... 384/517 |

* cited by examiner

*Primary Examiner*—Dang Le
*Assistant Examiner*—Nguyen Hanh

(57) ABSTRACT

This invention relates to a method and structure for minimizing noise output of the electric motors of an electrically variable transmission by placing springs between the ball bearings of the motors and a housing part of the motor assembly. The springs are preferably disc or wave springs configured to consistently force the balls against the race of the ball bearings, thereby minimizing the noise output of the electrically variable transmission when in operation.

4 Claims, 2 Drawing Sheets

INTEGRATED MOTOR BEARING SPRINGS FOR HYBRID ELECTRO-MECHANICAL TRANSMISSION AND METHOD

CROSS-REFERENCE TO RELATED APPLICATIONS

This application claims the benefit of U.S. Provisional Application No. 60/555,141 filed Mar. 22, 2004.

TECHNICAL FIELD

This invention relates to minimizing the noise output of an electrically variable transmission having a pair of electric motor assemblies, ball bearings, and other components stacked along a common axis.

BACKGROUND

The movable components within a vehicle's powertrain can generate unwanted noise audible inside or outside the vehicle. Multiple moving components can magnify such noise. For example, an electrically variable transmission with multiple electric motor assemblies may be noisy. When two or more motors are operating, the noise output of the transmission is magnified.

SUMMARY OF THE INVENTION

Understanding that consumers desire a quiet riding vehicle, the present invention provides a vehicle having an electrically variable transmission with a plurality of parts, including a pair of electric motor assemblies and ball bearings in a race, selectively assembled along a common axis. A spring is stacked in each motor assembly between a housing of the electric motor assembly and an adjacent part such as a ball bearing race in the stack-up of transmission parts. The spring is sufficiently expandable to accommodate the geometrical stack tolerance of the assembled transmission parts and to consistently force the balls of the ball bearings against the race and minimizing the noise output of the electrically variable transmission.

In one aspect of the present invention, a disc spring is utilized. However, in another aspect of the present invention a wave spring is utilized.

More specifically, the present invention provides an electrically variable transmission with a plurality of transmission components disposed along a common axis. The transmission components include a motor housing; and a rotor movable along a ball bearing having balls and a race. A spring is further provided and operatively connected between the motor housing and the roller bearing to provide an axial thrust load against the ball bearing to force the race against the balls to minimize noise. The spring is sufficiently expandable to accommodate or compensate for tolerance stack up (or the geometrical stack tolerance) in the plurality of transmission components.

Furthermore, the present invention provides a method of reducing the noise output of an electrically variable transmission with a pair of electric motor assemblies and a set of ball bearings in a race. The method includes: placing a spring between the set of ball bearings and a motor housing of the electric motor assembly, where the spring is operative to minimize the noise output of the electrically variable transmission by consistently forcing the race of the at least one set of ball bearings against the balls to minimize noise.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
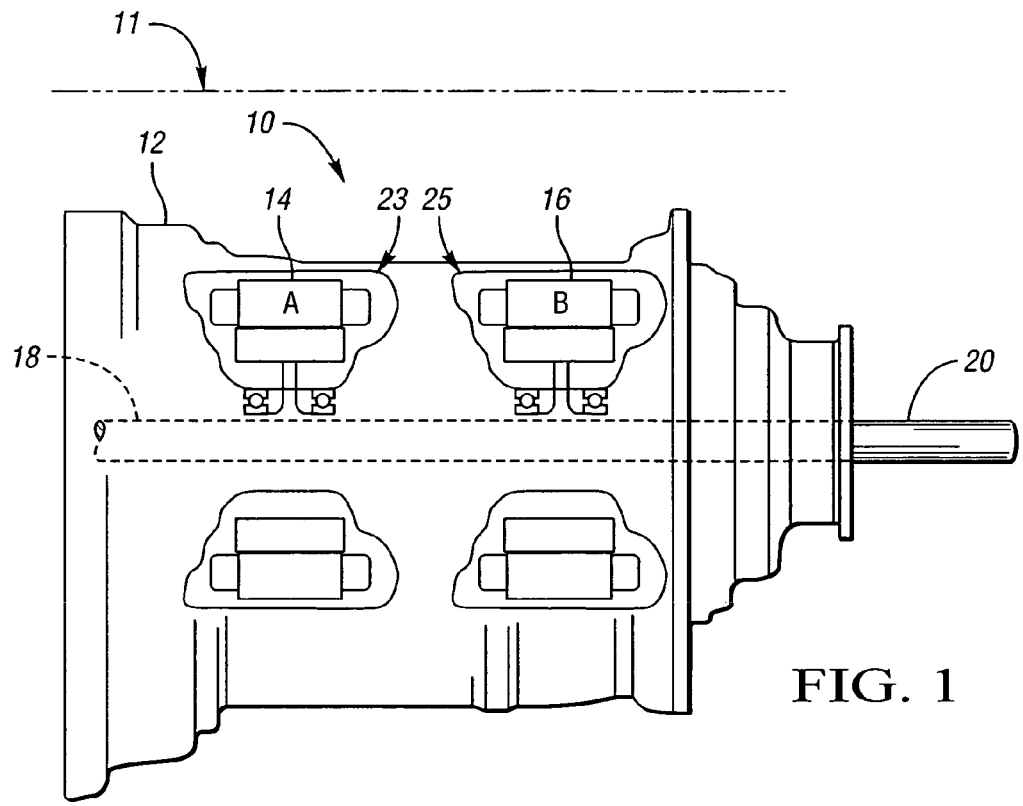
FIG. 1 is a schematic side elevational view of an electro-mechanical transmission housing for a vehicle with parts broken away to show the electrical motor assemblies in their respective housings.
Figure 2:
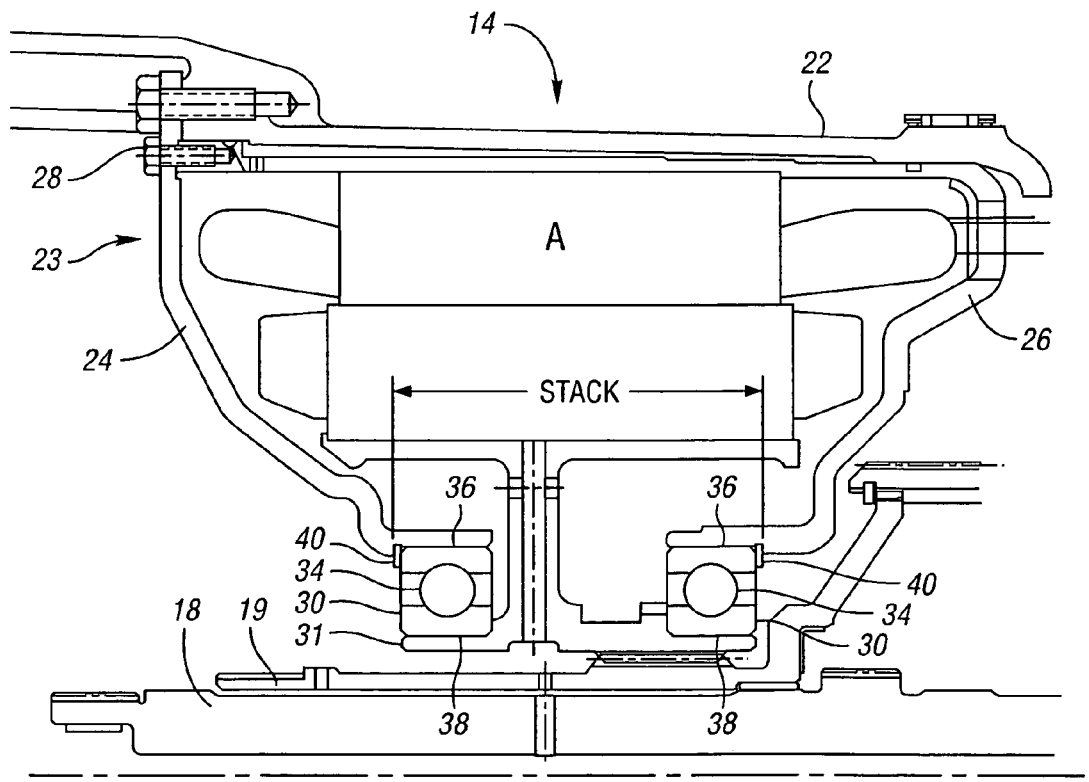
FIG. 2 is a schematic side cross-sectional view of one of the electric motor assemblies with disc springs between the housing parts of the motor assembly and each of the two sets of ball bearings.

Referring to the drawings, FIGS. 1 through 4, wherein like characters represent the same or corresponding parts throughout the several views, there is shown in FIG. 1 a schematic side elevational view of an electrically variable transmission 10 in a vehicle 11. Basically, the electrically variable transmission 10, includes a plurality of transmission parts, selectively assembled in a stack along a main shaft 18 (also indicated in FIG. 2). The plurality of transmission parts includes a pair of electric motor assemblies 14 and 16, each motor assembly having a housing (defined by housing parts 24 and 26 as shown in FIG. 2) and at least one set of ball bearings 30 in a race also assembled in the stack. The stack has a maximum stack up tolerance which is the sum of the part tolerances for each of the assembled transmission parts in the stack. For example, if the stack includes five components each having a tolerance of plus or minus 0.5 mm in an axial direction, then the maximum stack up tolerance is 2.5 mm. The invention further includes at least one spring 40 in each motor assembly 14 and 16 between the housing parts (24 and 26) of each electric motor assembly and any stacked part in the plurality of transmission parts. The spring 40 is expandable to accommodate the stack up tolerance for the assembled transmission parts (24, 36 and 31 or 26, 36 and 31). The spring 40 also provides a sufficient thrust load on the respective race of each ball bearing to ensure that the balls 34 of the ball bearings are consistently forced against the race to minimize noise as the balls 34 are confined to the race and prevented from digressing in the radial or axial direction.

More specifically, the electrically variable transmission 10 consists of a main housing 12, as shown in FIG. 1. The main housing 12 contains two electric motors (A and B), which have their respective motor assemblies (or modules) 14 and 16. Motors A and B are mounted concentrically with the main shaft 18 of the transmission, which is selectively linked to the output shaft 20 of the transmission. The motors (A, B) operate to selectively engage with clutches and gears (e.g., the tube shaft 19 as shown in FIG. 2) to rotate or be rotated by the main shaft 18 at variable speeds and indirectly rotate the output shaft 20 (as shown in FIG. 1). The utilization of the second motor, B, which is also bearing mounted increases the noise output of the electrically variable transmission 10 during operation.

Subjacent a portion of the transmission housing 12 at 22, each motor housing 23, 25 consists of two main housing parts 24 and 26 as shown in FIG. 2. The first portion 24 of the motor housing 14 is secured to the second portion 26 of the motor housing by a series of structural connectors 28. Subjacent the first portion 24 and second portion 26 of the motor housing are two bearings 30 journaled onto the motor rotor 31. The bearings 30 function to reduce the friction between the electric motor housing (defined by 24 and 26) and the motor rotor 31. In the preferred embodiment, the bearings 30 are ball bearings with balls 34 in a race defined by the upper and lower sections of the bearing, 36 and 38 respectively. These balls 34 bear radial and thrust loads caused by the motor A, enabling the motor rotor 31 to spin smoothly. The balls 34 of the bearing 30 must consistently stay within their respective races (defined by 36 and 38) to minimize their noise output. If not kept within a race, the balls 34 may backlash or randomly move axially with respect to the motor assembly 14 thereby creating noise.

Figures 3, 4:
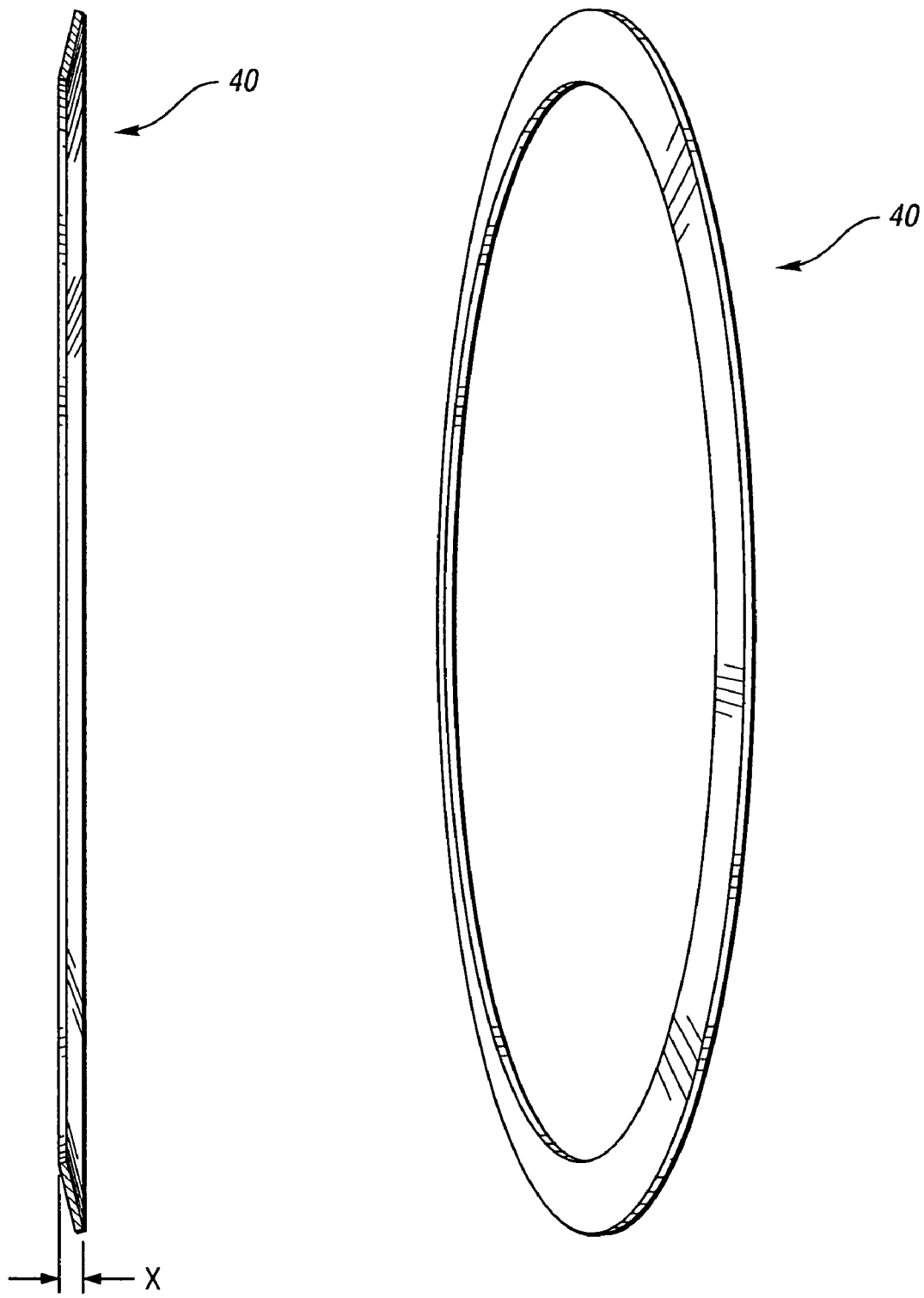
FIG. 3 is a schematic side cross-sectional view of a disc spring isolated from the transmission.
FIG. 4 is a schematic perspective view of the disc spring isolated from the transmission.

One technical advantage of the present invention is the spring 40 included between the upper section 36 of the bearing 30 and the first housing portion 24 (or second housing portion 26) of the motor housing. Each spring 40 provides axial thrust loading to the bearings 30 to ensure that the balls 34 remain within or against the race defined by 36 and 38. In the preferred embodiment, the spring 40 is expandable over a length, X (as shown in FIG. 3), which is in excess of the stack up tolerance (or tolerance stack up) of the assembled transmission parts (24, 36 and 31 or 26, 26 and 31). This ensures that each ball 34 is in contact with the respective races 36, 38 of each bearing 30 throughout the various mass-produced electrically variable transmissions whereby to accommodate any dimensional variance of parts within their tolerance specifications. The weight of the motor housing (24 or 26) confines the balls 34 in the radial direction and the force of the spring 40 restricts the balls in the axial direction.

In the preferred embodiment, the spring 40 is an axially deformable disc spring as shown in FIGS. 3 and 4. Alternatively, the spring 40 may be a wave spring or any other energy absorbing mechanism known to persons of ordinary skill in the art.

Though roller bearings may, in some instances, be quieter than ball bearings, they are generally more expensive. Therefore, the inclusion of the spring 40 in motor assemblies with ball bearings also provides a more economically advantageous alternative to the use of roller bearings.

Moreover, the present invention provides a method of reducing the noise output of an electrically variable transmission 10 with a pair of electric motor assemblies (14 and 16), as shown in FIG. 1, and a set of ball bearings 30 in a race (defined by 36 and 38 in FIG. 2). The method includes: placing a spring 40 between the set of ball bearings 30 and a housing part (24 or 26) of the electric motor assembly, where the spring 40 is operative to minimize the noise output of the electrically variable transmission by consistently forcing the balls 34 of the at least one set of ball bearings against the race thereby preventing the balls from transgressing in the radial or axial directions to minimize noise.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission, comprising:
   a rotatable main shaft of the transmission;
   a plurality of transmission components disposed along said main shaft, said plurality of transmission components being assembled in a stack along said main shaft and including a motor housing, a ball bearing having balls and a race, and a rotor portion operatively connected to said main shaft and movable along said ball bearing, said motor housing at least partially enclosing said rotor portion; and
   a spring operatively connected between said motor housing and said ball bearing to provide an axial thrust load against said ball bearing to force said race against said balls to minimize noise;
   wherein said spring is configured for expanding in an axial direction along a length of said spring to accommodate a tolerance stack up of said plurality of transmission components in said axial direction.

2. The transmission of claim 1, wherein said spring is a disc spring.

3. An electrically variable transmission, comprising:
   a motor assembly having a housing and a rotor at least partially enclosed within said housing, a set of ball bearings, and a rotor portion assembled in a stack along a rotatable main shaft of the transmission, said rotor portion being a radially-inward extending portion of said rotor;
   said set of ball bearings having an upper section and a lower section defining a race therebetween, said set of ball bearings containing a plurality of balls in said race;
   wherein said stack defines a maximum stack up tolerance measurable along a primary axis of said rotatable main shaft; and
   at least one spring positioned between said housing and said upper section of said set of ball bearings, said at least one spring having an expandable length that is expandable in an axial direction up to a maximum length in excess of said maximum stack up tolerance;
   wherein said at least one spring provides a sufficient axial thrust load on said race so that said plurality of balls of said set of ball bearings are consistently forced against said race to minimize noise, said at least one spring being configured to expand along said expandable length to thereby accommodate said maximum stack up tolerance.

4. The transmission of claim 3, wherein said spring is a disc spring.

* * * * *